United States Patent
DePaul et al.

(10) Patent No.: US 7,570,585 B2
(45) Date of Patent: Aug. 4, 2009

(54) FACILITATING DSLAM-HOSTED TRAFFIC MANAGEMENT FUNCTIONALITY

(75) Inventors: Kenneth E. DePaul, Wake Forest, NC (US); Eric Jaramillo, Holly Springs, NC (US)

(73) Assignee: Alcatel Lucent, Paris (FR)

( * ) Notice: Subject to any disclaimer, the term of this patent is extended or adjusted under 35 U.S.C. 154(b) by 1430 days.

(21) Appl. No.: 10/320,163

(22) Filed: Dec. 16, 2002

(65) Prior Publication Data

US 2007/0053292 A1 Mar. 8, 2007

(51) Int. Cl.
*H04J 1/16* (2006.01)
*H04J 3/14* (2006.01)
(52) U.S. Cl. ..................................... 370/229
(58) Field of Classification Search ........................ None
See application file for complete search history.

(56) References Cited

U.S. PATENT DOCUMENTS

| 6,377,435 B1 | 4/2002 | Nabell et al. | |
|---|---|---|---|
| 7,002,974 B1* | 2/2006 | Deerman et al. | 370/401 |
| 7,023,856 B1* | 4/2006 | Washabaugh et al. | 370/395.1 |
| 7,206,313 B2* | 4/2007 | Maher et al. | 370/401 |
| 7,295,566 B1* | 11/2007 | Chiu et al. | 370/419 |
| 2002/0188732 A1* | 12/2002 | Buckman et al. | 709/228 |
| 2003/0012197 A1* | 1/2003 | Yazaki et al. | 370/392 |
| 2003/0223367 A1* | 12/2003 | Shay et al. | 370/231 |
| 2004/0010592 A1* | 1/2004 | Carver et al. | 709/226 |
| 2005/0100009 A1* | 5/2005 | Botvich | 370/389 |
| 2006/0126624 A1* | 6/2006 | Yazaki et al. | 370/389 |

FOREIGN PATENT DOCUMENTS

| EP | 1 073 251 A | 1/2001 |
|---|---|---|
| EP | 1 379 088 A | 1/2004 |
| FR | 2825530 | 12/2002 |
| JP | 60086995 | 5/1985 |
| KR | 2003080153 A | 10/2003 |
| WO | WO 02/14979 | 2/2002 |

* cited by examiner

*Primary Examiner*—Ajit Patel

(57) ABSTRACT

One embodiment of the disclosures made herein is a method for managing traffic flows through a Digital Subscriber Line Access Multiplexor (DSLAM). In accordance with such embodiment, the method includes performing an operation for analyzing a traffic flow arriving at a DSLAM, wherein a type of the traffic flow is identified. Analyzing the traffic flow is performed on at least one of layer 4, layer 5, layer 6 and layer 7 of an Open Systems Interconnection model. After analyzing the traffic flow, an operation is performed for associating a traffic flow identifier with the traffic flow. The traffic flow identifier corresponds to the type of the traffic flow. After associating the traffic flow identifier with the traffic flow, an operation is performed for facilitating identifier-designated processing of the traffic flow. Facilitating identifier-designated processing is performed at least partially dependent upon at least one of the type of the traffic flow, an intended recipient of the traffic flow and an originator of the traffic flow.

6 Claims, 12 Drawing Sheets

FACILITATING DSLAM-HOSTED TRAFFIC MANAGEMENT FUNCTIONALITY

FIELD OF THE DISCLOSURE

The disclosures made herein relate generally to Digital Subscriber Line Access Multiplexers (DSLAMs) and more particularly to facilitating traffic management functionality at a DSLAM.

BACKGROUND

Various types of high-bandwidth content (i.e., rich content) are now being offered to service subscribers over Digital Subscriber Line (DSL) connections. Subscribers accessing high-bandwidth content via DSL connections are generally referred to herein as broadband users. Streamed videos, multicast videos, real-time communication, videoconferencing and network-based gaming applications are examples of such high-bandwidth content offered to broadband users.

As new types of high-bandwidth content are offered and the number of broadband users continues to grow, networks carrying traffic corresponding to such high-bandwidth content will need to be enhanced to address dramatic increases in both bandwidth usage and traffic. These increases in bandwidth usage and traffic will adversely affect performance in conventional network implementations. Saturation of a service provider's relatively high-bandwidth connections to the Internet, which are expensive to maintain and operate, is one example of such adverse affect associated with conventional network implementations.

Even though DSL connections can typically be provisioned at data rates that are dozens of times faster than current dial up lines, actual DSL connections of many broadband user's often do not approach these provisioned data rates. In many instances, a "bottleneck" effect occurs in the network of an Internet Service Provider (ISP) or the ISP's Point of Presence (POP) to the Internet. This bottleneck effect governs actual data rates.

A limitation of convention network implementations with respect to offering high-bandwidth content is the location from where high-bandwidth content is served via conventional network implementations. Conventional network implementations typically serve high-bandwidth content from centralized locations, such as an ISP's network, the ISP's POP to the Internet and/or from a content providers server. In some instances, servers adapted for providing caching functionality (i.e., caching servers) have been implemented in the ISP's network to enhance access to high-bandwidth content. However, ISP and content providers can be relatively far from the edge of a broadband user's DSL access network, which adversely affects delivering high-bandwidth content in an effective and efficient manner.

Another limitation of convention network implementations with respect to offering high-bandwidth content is that DSLAM's are only aware of layer 2 and layer 3 of an Open Systems Interconnect (OSI) model (i.e., data link layer and network layer, respectively). Accordingly, DSLAM's in conventional network implementations (i.e., conventional DSLAM's) can only make decisions based on these two layers. Making decisions based on only these two layers limits the degree to which traffic traversing the DSLAM can be analysed and organized, thus adversely impacting the ability of delivering high-bandwidth content in an effective and efficient manner.

Conventional flow control mechanisms that enhance the manner in which traffic traversing the DSLAM can be analysed and organized do exist. However, such conventional flow control mechanisms are located relatively far from the edge of a broadband user's DSL access network (e.g., at the ISP's POP or in the ISP's network), thus adversely affecting delivery of high-bandwidth content. Some of these conventional flow control mechanisms have evolved primarily from enterprise requirements and can address analysing and organizing traffic traversing the DSLAM at one or more layers in the OSI model, but are typically unable to deliver performance and full-featured functionality required to support a large carrier network.

Therefore, methods and equipment adapted for facilitating traffic management functionality at a DSLAM in a matter that overcomes limitations associated with delivering high-bandwidth content via conventional network implementations would be useful.

BRIEF DESCRIPTION OF THE DRAWING FIGURES

DETAILED DESCRIPTION OF THE DRAWING FIGURES

The disclosures made herein relate to facilitating traffic management functionality at an edge of an access network via a DSLAM. (i.e., DSLAM-hosted traffic management functionality). Because a DSLAM is located at the edge of an access network, closest to DSL subscribers served by the DSLAM, traffic management functionality as disclosed herein is provided in a manner that bypasses the public Internet (i.e., an example of a public network) when hosted at a DSLAM. Bypassing the public Internet allows various types of server functionality to be provided to the DSL subscriber in a fast, safe and reliable manner relative to conventional network implementations.

The DSLAM-hosted traffic management functionality disclosed herein represents a distributed approach to facilitating traffic management. Such a distributed approach to traffic management enhances scalability of a network by moving traffic management functionality to the edges of the access network. Furthermore, such a distributed approach to facilitating traffic management supports offering broadband content to a large number of DSL subscribers without the drawbacks associated with conventional traffic management approaches.

Figure 1:
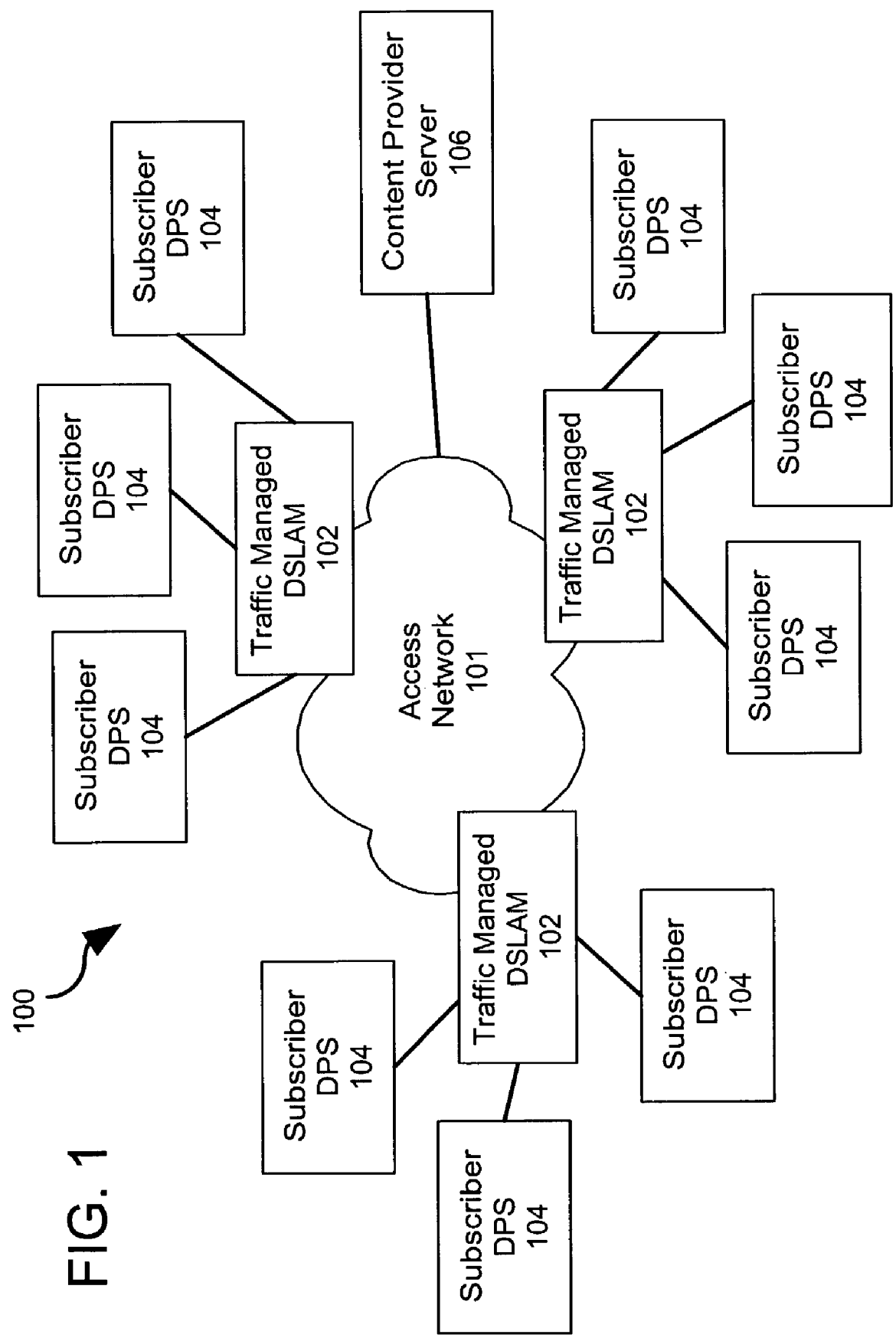
FIG. 1 depicts a communication apparatus in accordance with an embodiment of the disclosures made herein, wherein communication apparatus includes an access network comprising a plurality of traffic managed DSLAMs.

Referring to FIG. 1, a communication apparatus 100 in accordance with an embodiment of the disclosures made herein is depicted. The communication apparatus 100 includes a network access 101 (including a plurality of traffic managed DSLAMS 102), a plurality of DSL subscriber data processing systems (DPS) 104 and a plurality of content provider servers 106. The plurality of DSL subscriber data processing systems (DPS) 104 are served by a respective one of the traffic managed DSLAMS 102. Each one of the traffic managed DSLAMS 102 is located at the edge of the access network 101. A DSLAM is an example of an apparatus adapted for facilitating digital subscriber line access multiplexing functionality.

The plurality of content provider servers 106 is connected to the access network 101. Each one of the DSL subscriber DPS 104 are capable of communication with one or more of the content provider servers 106 via a respective one of the traffic managed DSLAMS 102. As disclosed herein in greater detail below, the traffic managed DSLAMS 102 are adapted for managing delivery of content (i.e., one or more files) from the content provider servers 106 to the DSL subscriber DPS 104 in a manner that extends traffic flow and bandwidth capacity within the access network 101.

The traffic managed DSLAMS 102 depict embodiments of DSLAMS adapted for providing traffic flow processing functionality (i.e., DSLAM-hosted traffic management functionality). Providing traffic management functionality at the edge of the access network distributes traffic management functionality throughout the access network 101. Distributing traffic management throughout the access network at the DSLAMS 102 contributes to scalability of the access network 101 and contributes to extending traffic flow and bandwidth capacity within the access network 101.

Figure 2:
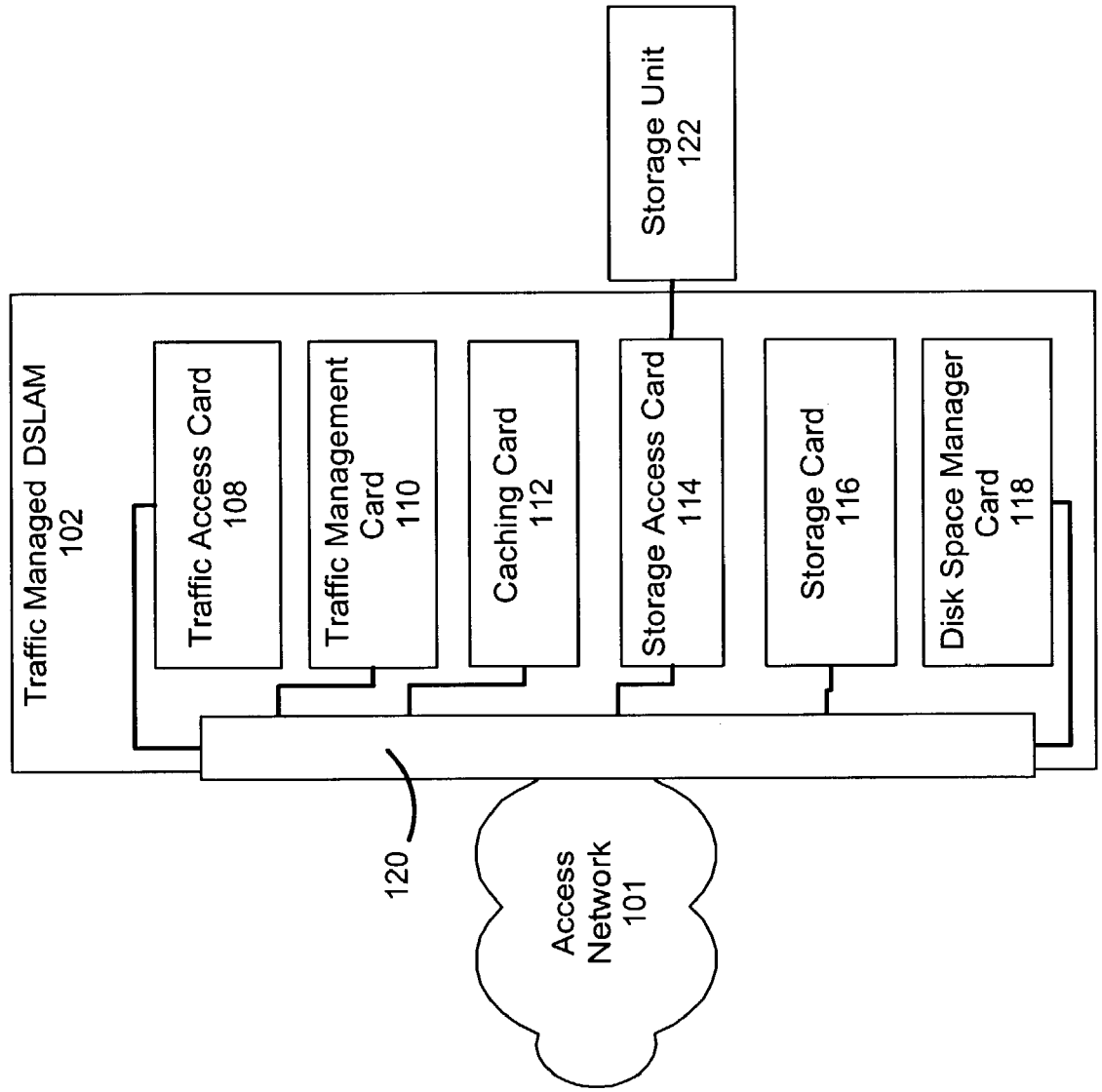
FIG. 2 depicts a traffic managed DSLAM in accordance with an embodiment of the disclosures made herein.

FIG. 2 depicts an embodiment of one of the traffic managed DSLAMS 102 (i.e., a traffic managed DSLAM 102) depicted in FIG. 1. The traffic managed DSLAM 102 includes a traffic access card 108, a traffic management card 110, a caching card 112, a storage access card 114, a storage card 116 and a disk space manager card 118, which are all DSLAM-hosted server cards. The traffic access card 108, the traffic management card 110, the caching card 112, the storage access card 114, the storage card 116 and the disk space manager card 118 are interconnectable to each other through a backplane 120 of the traffic managed DSLAM 102. In this manner, cross-connections are capable of being made between each of these various cards.

It is contemplated and disclosed herein that the traffic access card 108, the traffic management card 110, the caching card 112, the storage access card 114, the storage card 116 and the disk space manager card 118 may each be cards that plug into one or more slots (e.g., depending on size, power consumption, etc) of a chassis (not shown) of the traffic managed DSLAM 102. It is also contemplated and disclosed herein that, in at least one embodiment (not shown) of the disclosures made herein, at least one of the caching card 112, the storage access card 114 (and thus the storage unit 122), the storage card 116 and the disk space manager card 118 are omitted from the traffic managed DSLAM 102. In such cases of omission, functionality of an omitted card may be provided via another DSLAM-hosted server card or may be omitted, where applicable and appropriate.

Figure 3:
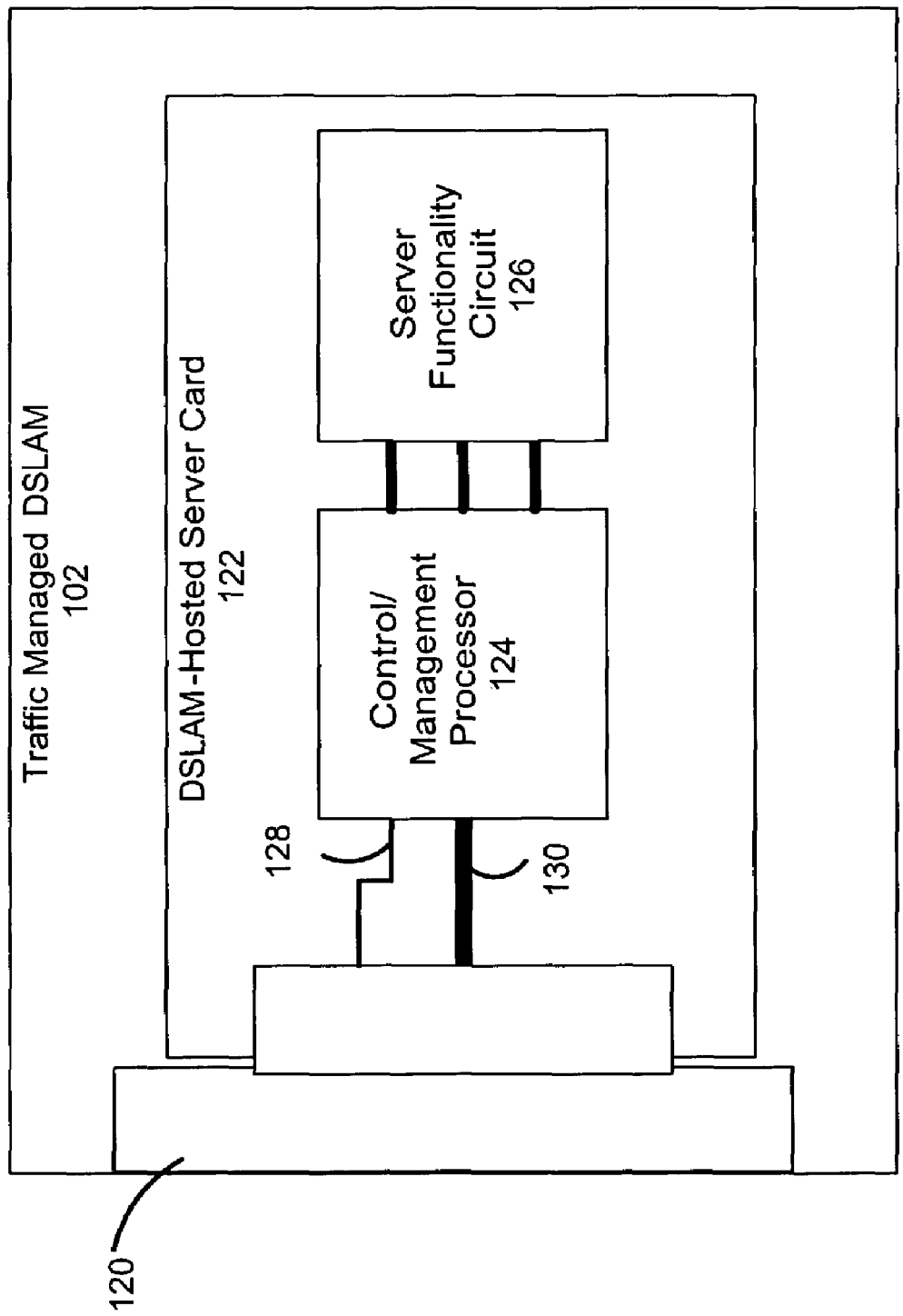
FIG. 3 depicts a DSLAM-hosted server card in accordance with an embodiment of the disclosures made herein.

FIG. 3 depicts a DSLAM-hosted server card 122 in accordance with an embodiment of the disclosures made herein. The DSLAM-hosted server card 122 includes a control/management processor 124 and a server functionality circuit 126 connected to the control/management processor 124. The DSLAM-hosted server card 122 communicates with other DSLAM hosted server cards via a control bus 128 and a data bus 130 (e.g., by a control cross-connection and a data cross-connection, respectively, through the backplane 120 of the traffic managed DSLAM 102). The server functionality circuit 126 is adapted for implementing a particular type of functionality (e.g., traffic access functionality, traffic management functionality, file caching functionality, file storage functionality and storage management functionality. Although not specifically shown herein, it is contemplated herein that functionality of the control/management processor 124 and functionality of the server functionality circuit 126 may be facilitated by a single processor (e.g., via the control/management processor 124).

Figure 4:
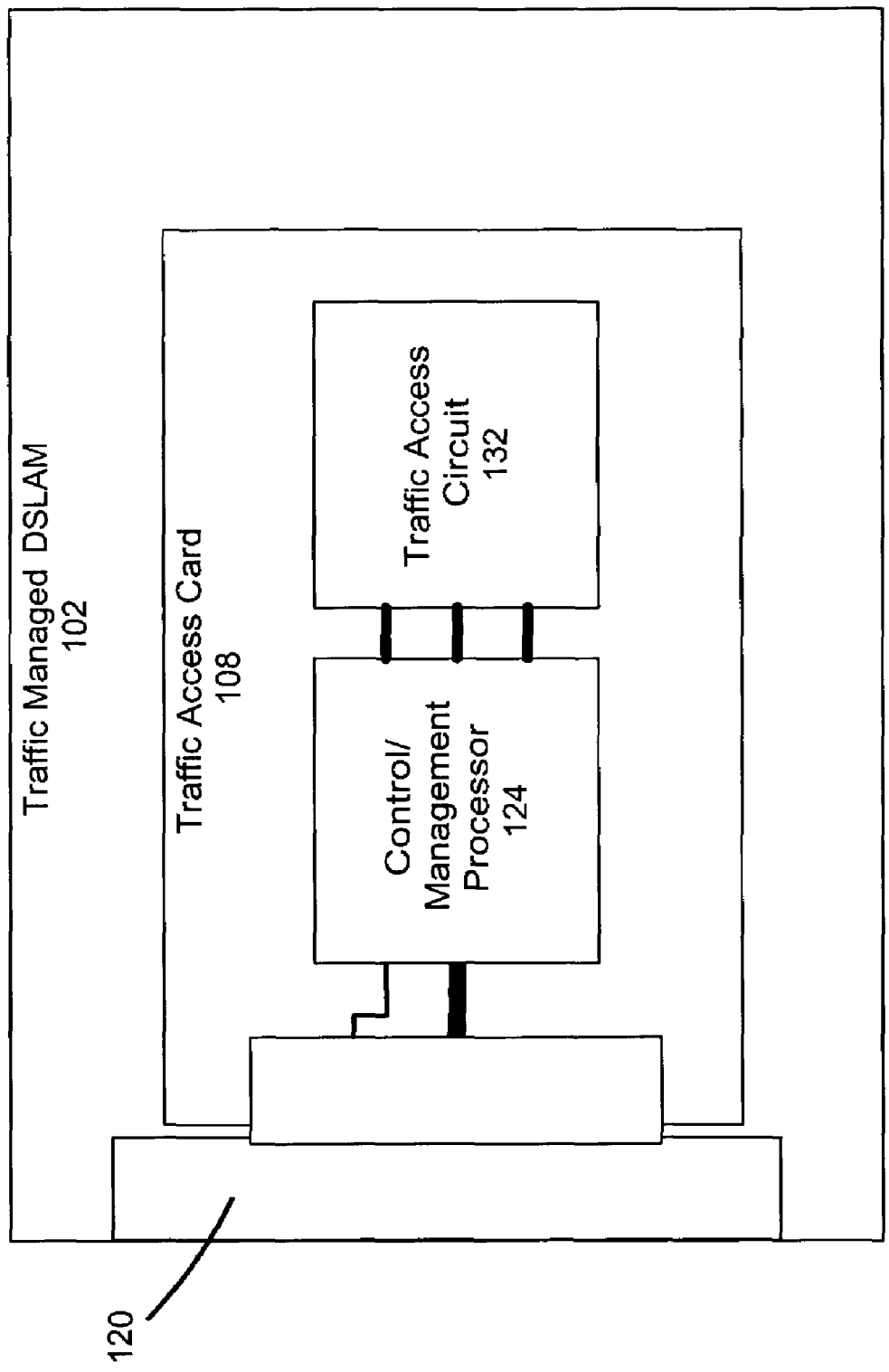
FIG. 4 depicts an embodiment of the traffic access card depicted in FIG. 2.

Turning now to discussion on specific DSLAM-hosted server cards and their associated functionality, an embodiment of the traffic access card 108 is depicted in FIG. 4. The traffic access card 108 includes a control/management processor 124 (discussed above in reference to FIG. 3) and a traffic access circuit 132 (e.g., a high speed interface circuit) connected to the control/management processor 108. The traffic access card 108 is adapted for enabling access to traffic arriving at the traffic managed DSLAM 102 (i.e., inbound traffic). All or a select portion of traffic arriving at the traffic managed DSLAM 102 is accessible to the traffic management card 110 (FIGS. 2 and 5) via the traffic access card 108. Traffic may be provided to the traffic management card 110 through the backplane 120 (as depicted) or through an interface (not shown), such as a parallel cable, connected directly between the traffic access circuit 132 and the traffic management card 110. Where necessary and appropriate, traffic may also be made accessible to other DSLAM-hosted server cards via the traffic access card 108.

The traffic management card 110 is adapted for facilitating DSLAM-hosted traffic management functionality in accordance with embodiments of the disclosures made herein. To this end, traffic flow control is implemented on higher layers of the OSI model as well as on lower layers. Higher layers of the OSI model refer to layers 4 through 7 of the OSI model (i.e., the transport layer, the session layer, the presentation layer and the application layer, respectively). Lower layers of the OSI model refer to layers 1 through 3 of the OSI model (i.e., physical layer, data link layer and network layer, respectively) Facilitating traffic management on information and capabilities associated with such higher layers of the OSI model is advantageous because traffic traversing a DSLAM can be analysed and acted to with greater granularity than is possible with conventional traffic management approaches.

OSI model Layer 1 (i.e., the physical layer) conveys the bit stream through a network at the electrical and mechanical level. It comprises the hardware for sending and receiving data on a carrier, including defining cables, cards and physical aspects. Fast Ethernet, RS232 and Asynchronous Transfer Mode (ATM) are communication protocols with physical layer components.

At OSI model Layer 2 (i.e., the data link layer), transmission units (e.g., data packets) are encoded and decoded into bits. OSI model Layer 2 furnishes transmission protocol knowledge and management and handles errors in the physical layer, flow control and frame synchronization. OSI model Layer 2 is divided into two sub-layers: A Media Access Control (MAC) sub-layer and a Logical Link Control (LLC) sub-layer. The MAC sub-layer controls how a data processing system on a network gains access to data and permission to transmit it. The LLC sub-layer controls frame synchronization, flow control and error checking.

OSI model Layer 3 (i.e., the network layer) provides switching and routing technologies, creating logical paths (i.e., known as virtual circuits) for transmitting data from node to node. Routing and forwarding are functions of this layer, as well as addressing, internetworking, error handling, congestion control and packet sequencing.

OSI model Layer 4 (i.e., the transport layer) provides transparent transfer of data between end systems, or hosts, and is responsible for end-to-end error recovery and flow control, thus ensuring complete data transfer.

OSI model Layer 5 (i.e., the session layer) establishes, manages and terminates connections between applications. The session layer sets up, coordinates, and terminates conversations, exchanges, and dialogues between the applications at each end of a connection. It facilitates session and connection coordination.

OSI model Layer 6 (i.e., the presentation layer) provides independence from differences in data representation (e.g., encryption) by translating from application to network format, and vice versa. The presentation layer works to transform data into the form that the application layer can accept. This layer formats and encrypts data to be sent across a network, providing freedom from compatibility problems.

OSI model Layer 7 (i.e., the application layer) supports application and end-user processes. Communication partners are identified, quality of service is identified, user authentication and privacy are considered, and any constraints on data syntax are identified. Everything at this layer is application-specific. This layer provides application services for file transfers, e-mail, and other network software services. Telnet and File Transfer Protocol are applications that exist entirely at OSI model Layer 7. Tiered application architectures are part of this layer.

The ability to make decisions on the traffic flows through a DSLAM at the higher layers of the OSI layer stack means that at the entry point of the access network, service providers will have the ability to manage their networks with a granularity that has not been available before in other solutions. This additional functionality allows the service providers to differentiate services based on the type of traffic that they are carrying and provides tools to create revenue based on these differentiated services. In addition, this solution is much more scalable than more centralized approaches of similar solutions while capitalizing on the cost savings of building this functionality into a product already in a carrier's network.

Figure 5:
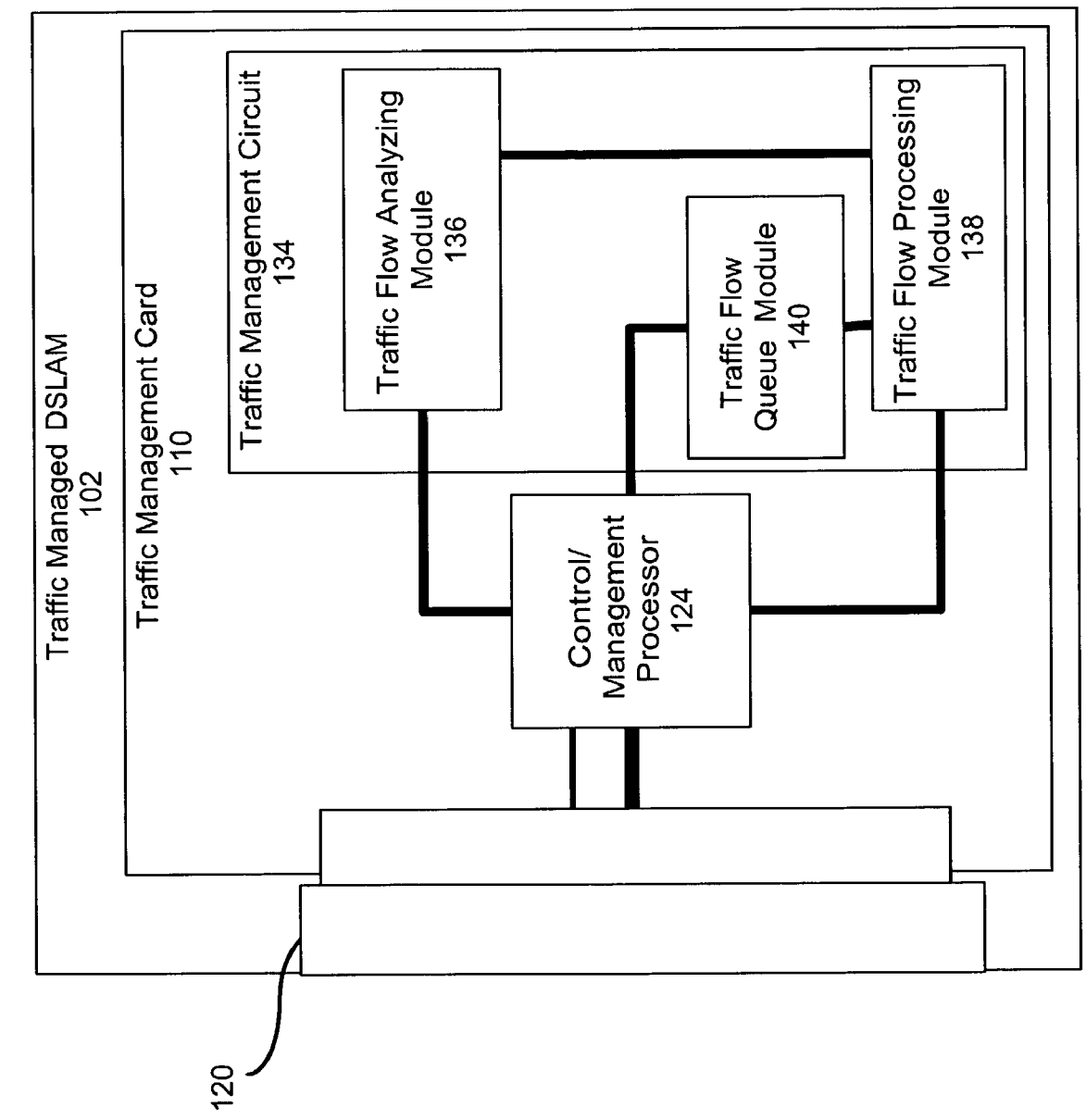
FIG. 5 depicts an embodiment of traffic management card depicted in FIG. 2.

FIG. 5 depicts an embodiment of the traffic management card 110. The traffic management card 110 is adapted for managing a rules database (e.g., stored elsewhere in the traffic managed DSLAM 102) and for making decisions based on traffic flow information in headers of traffic flow transmission units ((e.g., cells, packets, etc). A service provider administrator will be able to communicate with the traffic management card 110 via an Element Management System (no shown) that manages the DSLAM or a by an application written specifically to manage the traffic management functionality via a separate connection in the access network to the traffic management card 110.

The traffic management card 110 includes a control/management processor 124 (discussed above in reference to FIG. 3) and a traffic management circuit 134 (e.g., a high speed interface circuit) connected to the control/management processor 124. The traffic management card 110 is adapted for facilitating differentiated processing of various types of traffic flows arriving at the traffic managed DSLAM 102. All or a select portion of traffic arriving at the traffic managed DSLAM 102 is accessible to the traffic management card 110 via the traffic access card 108. Traffic may be provided to the traffic management card 110 through the backplane 120 (as depicted) or through an interface (not shown), such as a parallel cable, connected directly between the traffic access circuit 132 and the traffic management card 110.

The traffic management circuit 134 includes a traffic flow analysing module 136, a traffic flow processing module 138 and a traffic flow queue module 140. The traffic flow analysing module 136 is connected between the control/management processor 124 and the traffic flow processing module 138. The traffic flow analysing module 136 facilitates analysing traffic arriving at the traffic managed DSLAM 102 (i.e., traffic provided by the traffic access card 108) for enabling traffic flow information to be determined. A type of a traffic flow, an intended recipient of a traffic flow and a designated originator of a traffic flow are examples of traffic flow information. The traffic processing module 138 facilitates performing traffic management processes dependent upon information identified by the traffic flow analysing module 136. The traffic flow queue module 140 enables differentiated transmission of traffic flows.

Facilitating traffic management functionality in accordance with at least one embodiment of the disclosures made herein relies on flow control parameter functionality within the access network 101 (i.e., not in the traffic managed DSLAM 102) and on traffic management functionality within the traffic managed DSLAM 102 (e.g., via the traffic management card 110). The flow control parameter functionality is capable of being provided by a flow control parameter server that maintains flow control parameters for each traffic managed DSLAM 102. The traffic management functionality is capable of being provided by the traffic management card 110, which processes the parameters through inspection of each transmission unit, which travels through it. The parameters used during inspection of the transmission units are received via a protocol between the traffic management card 110 and one or more flow control parameter servers (not shown) that maintain flow control parameters (e.g., in a database) for each traffic managed DSLAM 102 in the access network 101.

Managing a plurality of traffic flows associated with a single DSL subscriber is an example of traffic management functionality in accordance with an embodiment of the disclosures made herein. In such an example, traffic is analysed as it arrived at a traffic managed DSLAM. Upon analysing the traffic, it is determined that a Video traffic flow, an e-mail traffic flow and an Internet traffic flow are destined for a particular DSL subscriber data processing system. A database is then accessed and entries are found that state: 1.) when a transmission flow of a video type is received for the particular DSL subscriber, priority of the traffic flow is increased to a designated level and bandwidth for that traffic flow is guaranteed at 1.5 Mbit, 2.) priority of e-mail traffic flows for the particular DSL subscriber is set to "best effort", not exceeding 64 Kbit and 3.) Internet flows are not affected in either way (e.g., the traffic flow bypasses further processing).

Figure 6:
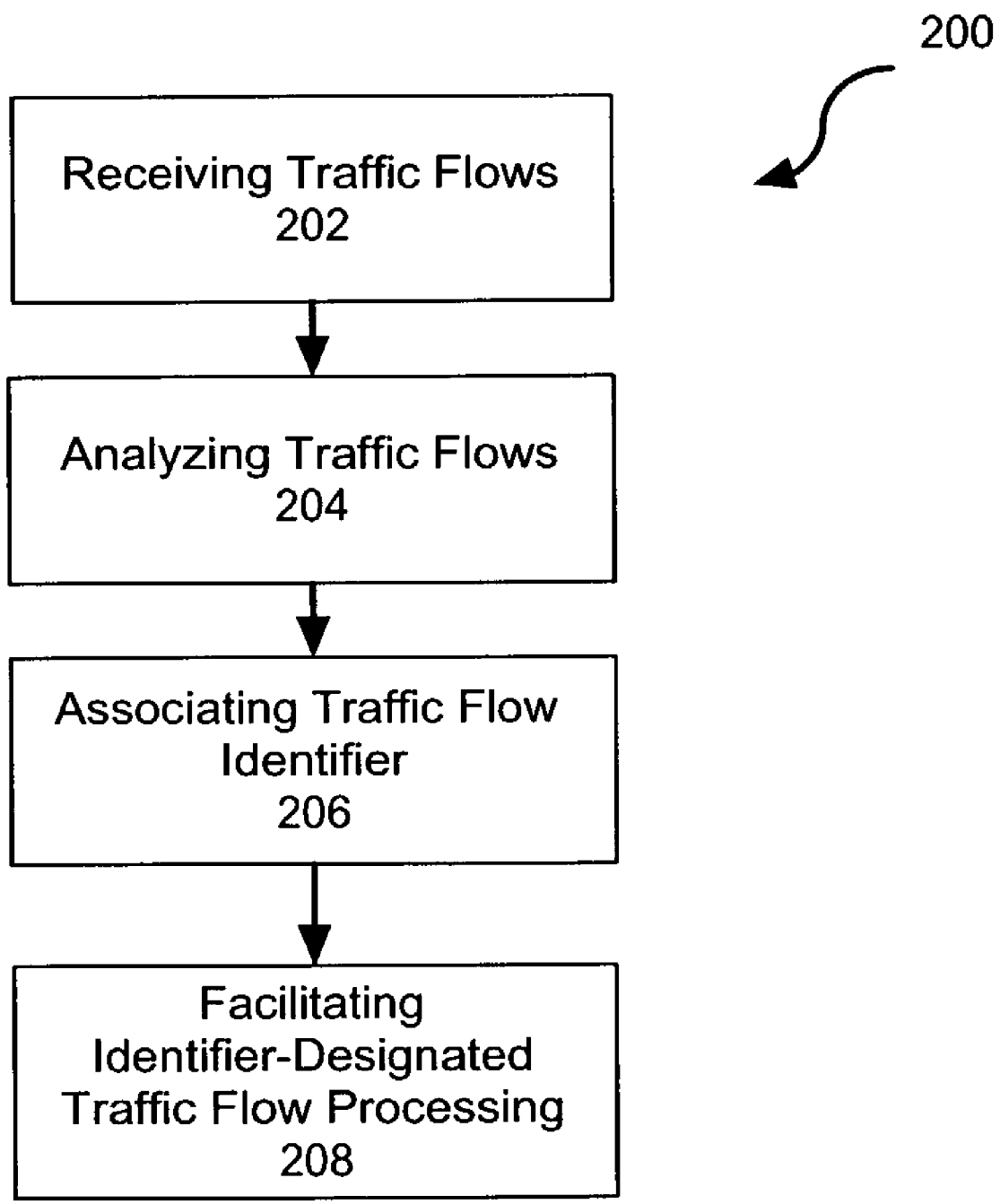
FIG. 6 depicts a method for facilitating DSLAM-hosted traffic management functionality in accordance with an embodiment of the disclosures made herein.

FIG. 6 depicts a method 200 for facilitating DSLAM-hosted traffic management functionality. A traffic management card in accordance with an embodiment of the disclosures made herein (e.g., the traffic management card 110) is capable of carrying out the method 200. An operation 202 is performed for receiving traffic comprising a plurality of traffic flows (i.e., inbound traffic flows). In response to receiving the traffic, an operation 204 is performed for analysing the traffic flows for determining traffic flow information. In response to determining traffic flow information of a traffic flow, an operation 206 is performed for associating a traffic flow identifier, which is dependent upon the traffic flow information, with the traffic flow. Tagging traffic flow transmission units (e.g., ATM cells) of the traffic flow with a designation corresponding to the traffic flow information is an example of associating the traffic flow identifier with the traffic flow. It is contemplated herein that certain traffic may bypass further processing once analysed.

In response to associating the traffic flow identifier with the traffic flow, an operation 208 is performed for facilitating identifier-designated traffic flow processing for accomplishing traffic management functionality corresponding to the traffic flow identifier (i.e., identifier-designated traffic flow processing). Examples of facilitating identifier-designated traffic flow processing include provisioning one or more connections (e.g., bandwidth and/or Quality of Service related parameters), setting a traffic flow priority level, directing a traffic flow to a designated traffic flow transmission queue, facilitating modification or deletion of designated traffic flow content (e.g., designated in a rules database), implementing functionality for maintaining a certain QoS guarantee, facilitating termination of a traffic flow transmission, facilitating redirection of a traffic flow from an intended recipient to another recipient (e.g., as designated in a rules database), caching a file in DSLAM-hosted storage and serving a file from DSLAM hosted storage. Provisioning one or more connections, setting a traffic flow priority level, directing a traffic flow to a designated traffic flow transmission queue, facilitating modification of traffic flow content, facilitating termination of a traffic flow transmission, caching a file in DSLAM-hosted storage and serving a file from DSLAM hosted storage are examples of traffic management processes in accordance with embodiments of the disclosures made herein.

The method 200 and apparatuses adapted for carrying out the method 200 are capable of performing a first traffic management process on a first traffic flow arriving at a DSLAM and performing a second traffic management process on a second traffic flow arriving at the DSLAM. To this end, the first traffic flow process accomplishes a first traffic management functionality and the second traffic flow process accomplishes a second traffic management functionality different than the first traffic management functionality. The first traffic flow and the second traffic flow are analyzed prior to performing the first traffic management process and the second traffic management process, respectively, such that a respective type of the first traffic flow and the second traffic flow are identified. In response to analyzing the first traffic flow and the second traffic flow, a first traffic flow identifier is associated with the first traffic flow and a second traffic flow identifier is associated with the second traffic flow. The first traffic flow identifier and the second traffic flow identifier correspond to the respective type of the first traffic flow and the second traffic flow. The first traffic management process and the second traffic management process are performed in a manner at least partially dependent upon the type of the first traffic flow and the second traffic flow, respectively.

The ability to facilitate traffic management functionality in the manner disclosed herein provides a considerable improvement over conventional (e.g., more centralized) approaches to traffic management functionality. These conventional approaches generally use relatively fast, but expensive, processors to handle the traffic in a centralized manner. These conventional approaches are still limited by the number of subscribers and flows that they can realistically analyse, provision and maintain. By facilitating traffic management functionality in a distributed manner as disclosed herein, relatively simple and cost-effective equipment (e.g., processors) may be used.

As briefly discussed above, caching files at the traffic managed DSLAM 102 and serving files from the traffic managed DSLAM 102 (i.e., DSLAM-hosted caching functionality) are examples of traffic management processes in accordance with embodiments of the disclosures made herein. Caching files in storage hosted at the traffic managed DSLAM 102 (i.e., (DSLAM-hosted storage) dramatically reduces a distance over which files need to be transmitted when serving the files to DSL subscribers served by the traffic managed DSLAM 102. Accordingly, the quality and quantity of content (particularly high-bandwidth broadband content) delivered to DSL subscribers served by the traffic managed DSLAM 102 can be greatly enhanced while the cost of delivery is reduced dramatically. DSLAM-hosted caching functionality represents an efficient and effective means for addressing bandwidth usage and traffic issues associated with serving bandwidth-intensive content to DSL subscribers.

DSLAM-hosted caching functionality as disclosed above is virtually invisible to DSL subscribers served by the traffic managed DSLAM 102. Furthermore, there is no need for additional Virtual Connection (VC's) or operational changes for such DSL subscribers. Cached files may be guaranteed to be up to date. The use of intelligent redirects insures that the geographically and/or logically closest files to a DSL subscriber requesting such content would be used even if the caching functionality in the traffic managed DSLAM closest to a particular DSL subscriber failed.

DSLAM-hosted caching functionality as disclosed herein allows content providers to provide and sell content with a much more efficient and cost effective approach than offered by conventional solutions. Such DSLAM-hosted caching functionality aids in the growth of the content distribution industry. Furthermore, this DSLAM-hosted caching functionality provides service provides (e.g., Internet service providers) with an additional revenue generating service that works seamlessly with their current investments in their network. Though this DSLAM-hosted caching functionality, service providers dramatically reduce their operational expense budget by not having to carry high bandwidth content back through their network or to the Internet POP.

Presently, DSL lines can typically be provisioned at dozens of times faster rates than current dial up lines. However, a DSL subscriber's experience often does not approach these speeds because there is a "bottleneck" effect that occurs in the service providers network or Point of Presence (POP) to the Internet. Caching files at a traffic managed DSLAM provides service providers with a low-investment solution for accommodating traffic volume and bandwidth requirements that are being placed or that will be placed on their broadband access networks.

Figure 7:
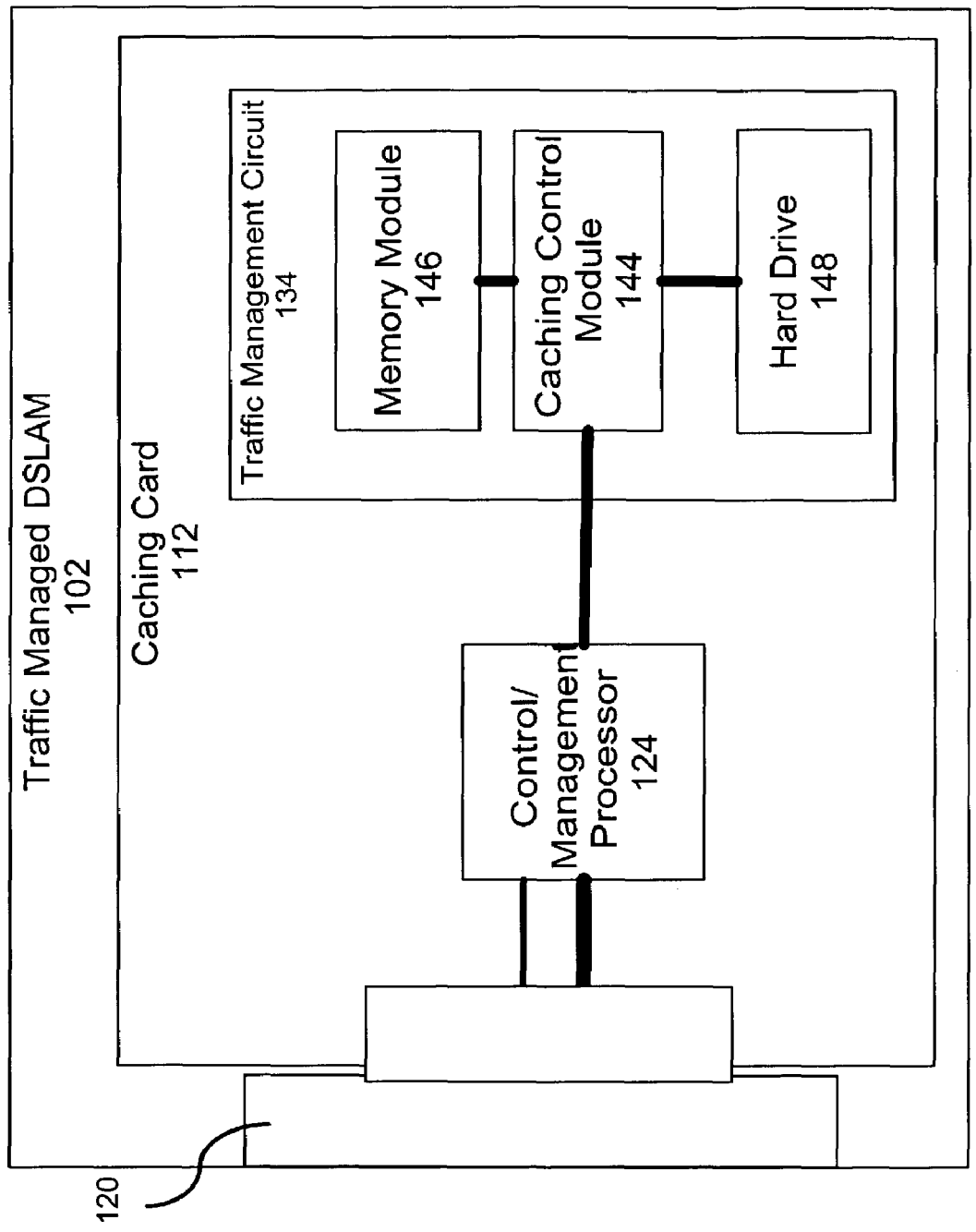
FIG. 7 depicts an embodiment of the caching card depicted in FIG. 2.

FIG. 7 depicts an embodiment of the caching card 112. The caching card 112 includes a control/management processor 124 (discussed above in reference to FIG. 3) and a caching circuit 142 connected to the control/management processor 124. The caching card 112 is adapted for facilitating caching of files in the traffic managed DSLAM 102 and for serving such cached files to DSL subscribers served by the traffic managed DSLAM 102. The caching card 112 would communicate to the access network 101 via another card of the traffic managed DSLAM 102 (e.g., the traffic access card 108) or via a network termination card of the traffic managed DSLAM 102.

Traffic flows containing files that are identified by the traffic management card 110 as meeting prescribed caching criteria are directed to the caching card 112. Furthermore, the caching card 112 manages all updates to cached files as well as what files should be removed as a result of being "expired" due to inaccuracy or lack of use. Also, as discussed below in greater detail, an authorized content provider may upload files to the caching card for being served from the traffic managed DSLAM 102. Files may be provided to the caching card 112 through the backplane 120 (as depicted) or through an interface (not shown), such as a parallel cable, connected directly between the caching circuit 142 and the traffic management card 110 or the traffic access card 108.

The caching circuit 142 includes a caching control module 144, a memory module 146 (i.e., volatile storage) and a hard drive 148 (i.e., non-volatile storage). It is contemplated that the caching circuit may include a plurality of other hard drives (not shown) in addition to the hard drive 148. A Random Access Memory module is an example of the memory module 146. The caching control module 144 is connected between the control/management processor 124 and each of the memory module 146 and the hard drive 148.

In at least one embodiment of the disclosures made herein, the caching card 112 is adapted for determining what content (e.g., a file in a traffic flow) is being accessed on a regular basis by DSL subscribers served by the traffic managed DSLAM 102 used the most and for storing a copy of that content locally in DSLAM-hosted storage (e.g., volatile and/or non-volatile storage). For example, Dynamic RAM (generally referred to as DRAM) would generally be used for caching content that is most frequently being accessed. Available disk storage space would be used as a "paging file" to maintain a copy of content from the Internet or an intranet that is not being accessed as frequently. Content that is seldom being accessed (or first time accessed) from the Internet or an intranet would be pulled from a normal pipe connection of the DSLAM service provider. Content is cached temporarily and is removed periodically to make room for newer content, if not used. The caching card 112 is also adapted for verifying the validity of content and keeping the content up to date.

Figure 8:
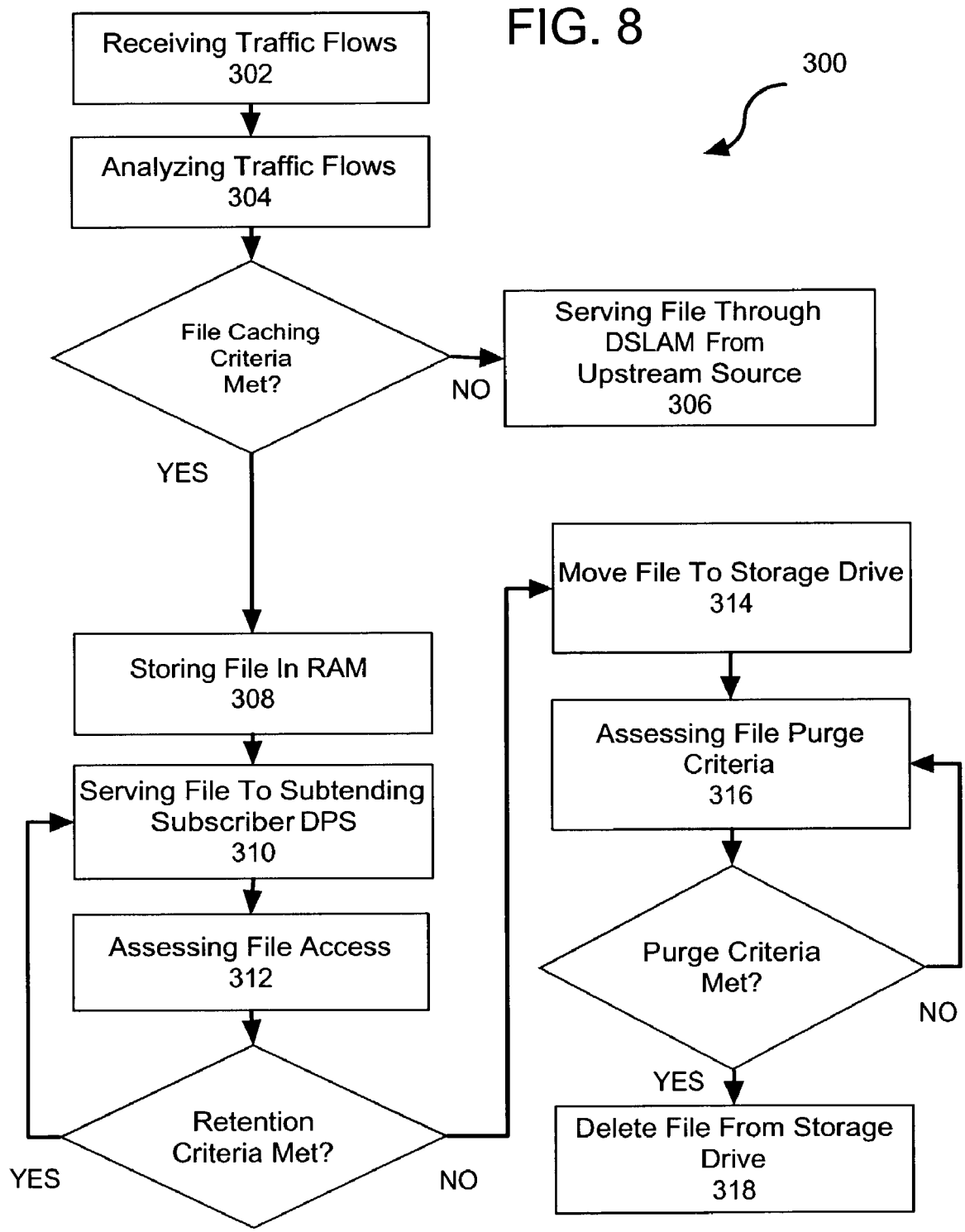
FIG. 8 depicts an embodiment of facilitating traffic management functionality for caching a file at a traffic managed DSLAM and serving the file to DSL subscribers served by a traffic managed DSLAM.

FIG. 8 depicts an embodiment of a method 300 for facilitating traffic management functionality (as discussed above in reference to FIG. 6) for accomplishing caching a file at a traffic managed DSLAM and serving the file to DSL subscribers (i.e., DSL subscriber data processing systems) served by a traffic managed DSLAM. An operation 302 is performed for receiving a traffic flow containing a file at a traffic managed DSLAM. The traffic flow is destined for a DSL subscriber served by the traffic managed DSLAM. In response to receiving the traffic flow, an operation 304 is performed for analysing the traffic flow for determining whether the file complies with file caching criteria (e.g., the file has been requested x times within y minute). In response to the file being determined to be in non-compliance with the file caching criteria, an operation 306 is performed for serving the file to the DSL subscriber from an upstream network node via the traffic managed DSLAM. If the file is compliant with the file caching criteria, an operation 308 is performed for storing the file (i.e., a copy of the file) in RAM (i.e., DSLAM-hosted volatile storage).

After the file is stored in RAM of the traffic managed DSLAM, an operation 310 is performed for serving the file to each DSL subscriber that request reception of the file within designated cache duration after the file is stored in RAM. Once the designated cache duration has elapsed, an operation 312 is performed for assessing file access for determining whether the file is in compliance with file retention criteria (e.g., the file has been requested x times within y hours). In response to the file being in compliance with the file retention criteria, the file remains in RAM and continues to be served to each DSL subscriber that request reception of the file within a next designated cache duration, so long as the file continues to comply with the file retention criteria.

In response to the file being in non-compliance with the file retention criteria, an operation 314 is performed for moving the file to a storage drive (i.e., DSLAM-hosted non-volatile storage). After the file is moved to the storage drive, an operation 316 is performed for assessing whether a file purge criteria is met (e.g., the file has not been requested A times within B hours). In response to the file purge criteria being met, an operation 318 is performed for deleting the file from the storage drive. In response to the file purge criteria not being met, the file remains in the storage drive, until the file purge criteria is met.

It is contemplated herein that a file requested by a DSL subscriber of the traffic managed DSLAM may already be cached in non-volatile storage (e.g., on a storage drive) of the traffic managed DSLAM when the traffic flow is received. Accordingly, in instances where the file must be served from RAM (i.e., volatile storage), an operation is performed for moving the file from non-volatile storage to RAM. Copying a file from a first location to a second location and deleting the file from the second location is an example of moving a file.

In at least one embodiment of the disclosures made herein, the caching card 112 is adapted for facilitating caching of a file at a request by a content provider and serving the file to DSL subscribers served by the traffic managed DSLAM 102. The content provider is authorized (e.g., via leasing hard drive and/or memory space) to host their content in one or more traffic managed DSLAMS 102 at the edge of the access network 101. To this end, content of the service provider resides in at least one traffic managed DSLAM 102 and does not depend on any other portion of the access network 101 or the public Internet for delivery. This approach to caching files allows the content provider to offer higher quality content in a faster and more reliable manner.

Figure 9:
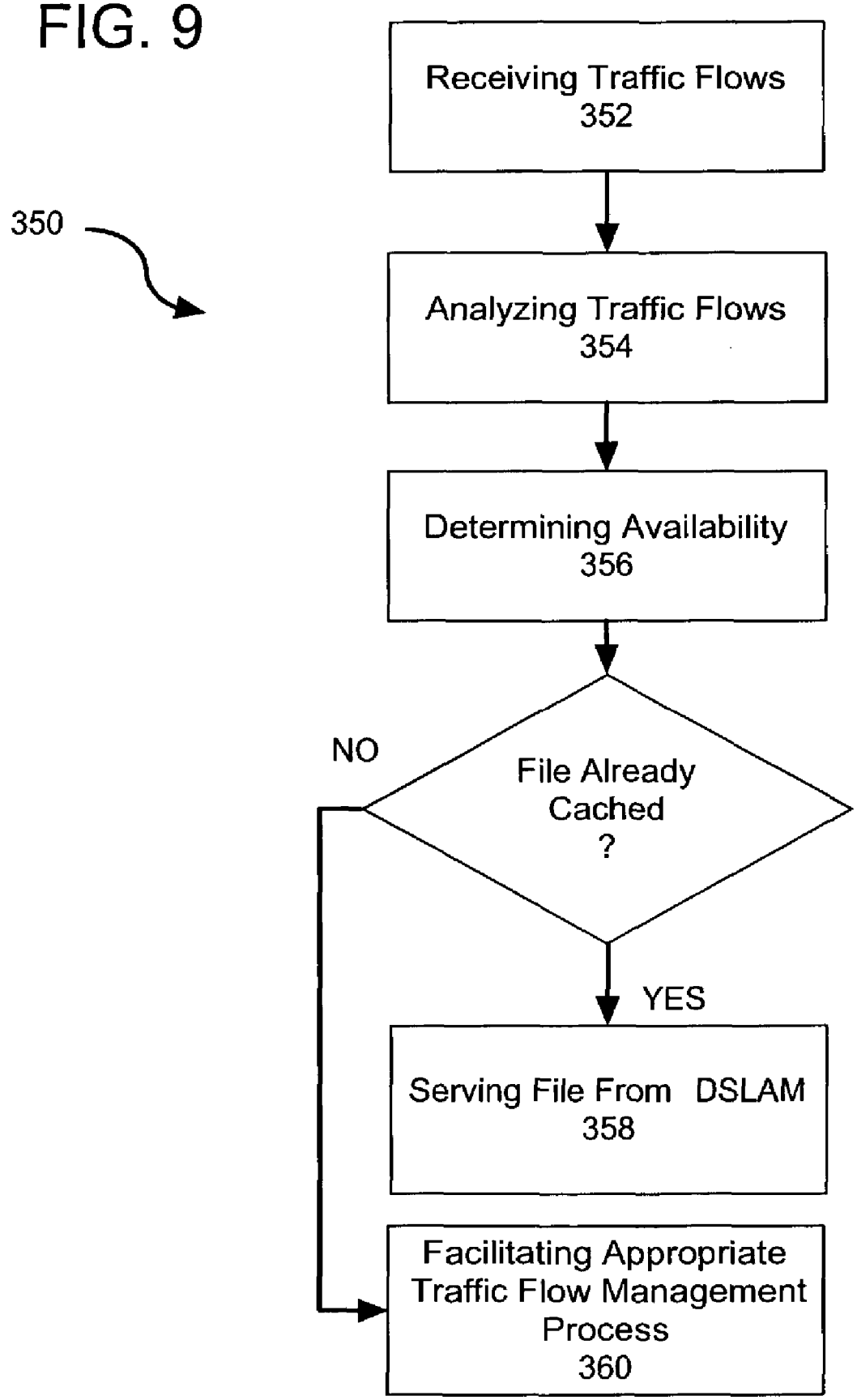
FIG. 9 depicts an embodiment of a method for facilitating traffic management functionality for serving a cached file to DSL subscribers served by a traffic managed DSLAM after the file is cached at the traffic managed DSLAM by a content provider.

FIG. 9 depicts an embodiment of a method 350 for facilitating traffic management functionality (as discussed above in reference to FIG. 6) to accomplish serving a file to DSL subscribers (i.e., DSL subscriber data processing systems) served by a traffic managed DSLAM after the file is cached at the traffic managed DSLAM by a content provider. An operation 352 is performed for receiving a traffic flow, which is destined for a content provider POP from a DSL subscriber served by the traffic managed DSLAM. After receiving the traffic flow, an operation 354 is performed for analysing the traffic flow for determining the traffic flow information, whereby it is determined that the traffic flow includes a request for a designated file (i.e., content from the content provider). After determining that the traffic flow includes a request for the designated file, an operation 356 is performed determining a caching availability of the file (i.e., is the file already cached). In response to the file being cached in DSLAM-hosted storage of the traffic managed DSLAM which serves the DSL subscriber, an operation 358 is performed for serving the file to the DSL subscriber from the DSLAM-hosted storage of the traffic managed DSLAM. In response to the file not already being cached, an operation 360 is performed for serving the file to the DSL subscriber from an upstream network node via the traffic managed DSLAM.

It should be understood that the term caching as used herein refers to a file stored on DSLAM hosted storage, rather than a particular type of DSLAM-hosted storage (e.g., volatile or non-volatile). The benefit of facilitating caching in accordance with embodiments of the disclosures made herein stems more from files being served from the traffic managed DSLAM 102 rather than from a particular type of DSLAM-hosted storage. Accordingly, a file cashed in accordance with an embodiment of the disclosures made herein may be served from DSLAM-hosted volatile storage or from DSLAM-hosted non-volatile storage.

It is contemplated herein that traffic management functionality (e.g., DSLAM-hosted caching functionality) may be implemented using any one of a plurality of DSLAM-hosted storage in the traffic managed DSLAM 102 (FIG. 2). Storage resident on the caching card 112, the storage card 116 and the storage unit 122 each represent DSLAM-hosted storage. Accordingly, files may be cached in storage of any one of the caching card 112, the storage card 116 and the storage unit 122.

Figure 10:
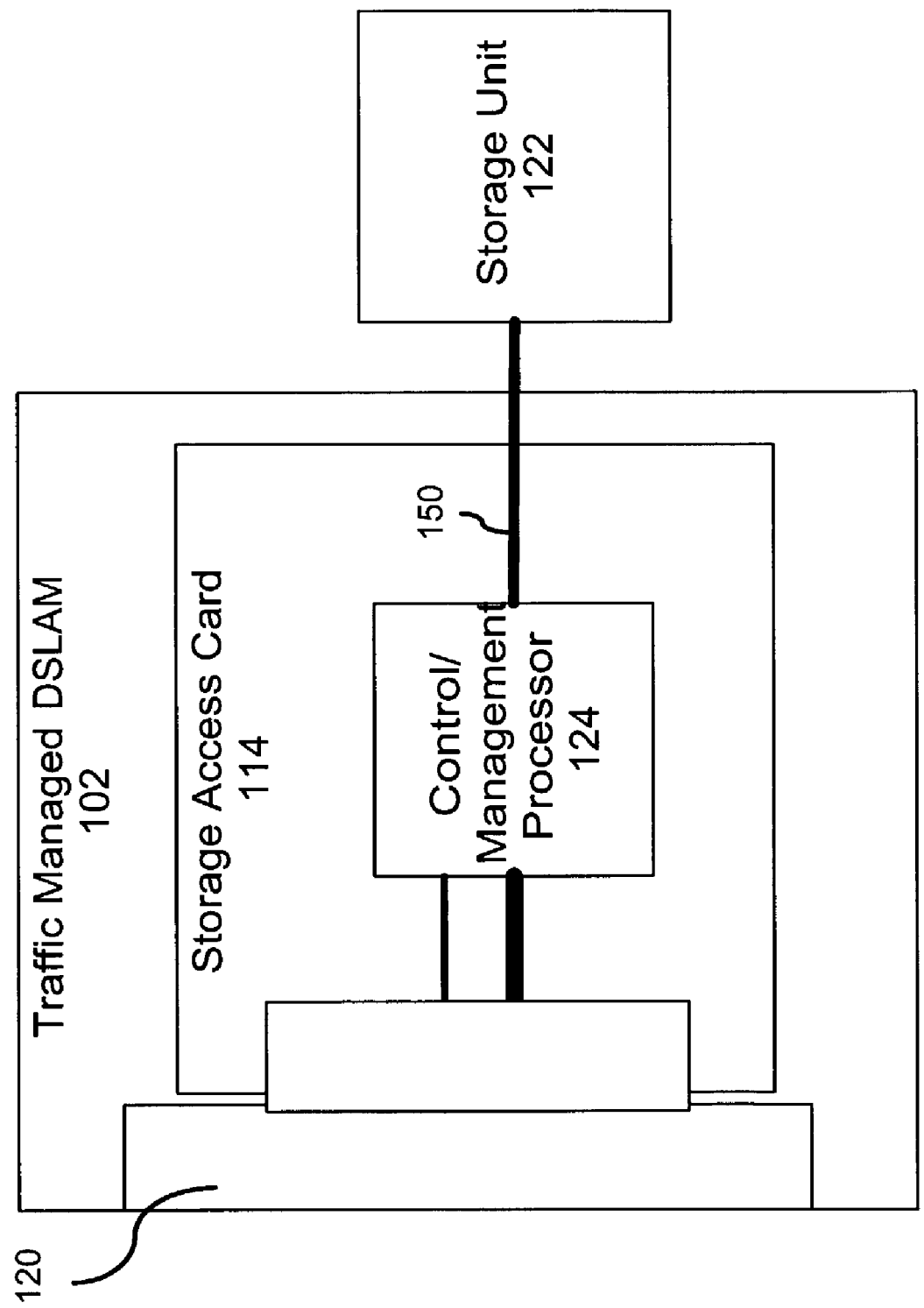
FIG. 10 depicts an embodiment of the storage access card depicted in FIG. 2.

FIG. 10 depicts an embodiment of the storage access card 114. The storage access card 114 facilitates access to and from the storage unit 122. To this end, the storage access card 114 includes a control/management processor 124 (discussed above in reference to FIG. 3). The storage access card 114 is connected to the storage unit 122 via a high-speed interface 150. Examples of the high-speed interface 150 include a gigabit Ethernet link, a high-speed serial link and a parallel data cable. In the depicted embodiment, the high-speed interface 150 terminates directly into the control/management processor 124. In another embodiment (not shown), a storage access circuit is connected between the control/management processor 124 and the high-speed interface 150.

The storage unit 122 is co-located with the traffic managed DSLAM 102 and is a network element of the access network 101. Because the storage unit 122 is not mounted within the traffic managed DSLAM 102, many attributes associated with the storage unit 122, such as power consumption, heat dissipation and size, do not directly impact the design of the traffic managed DSLAM 102. Furthermore, because the storage unit 122 is not mounted within the traffic managed DSLAM 102, the storage unit 122 may be an off-the-shelf storage device.

Figure 11:
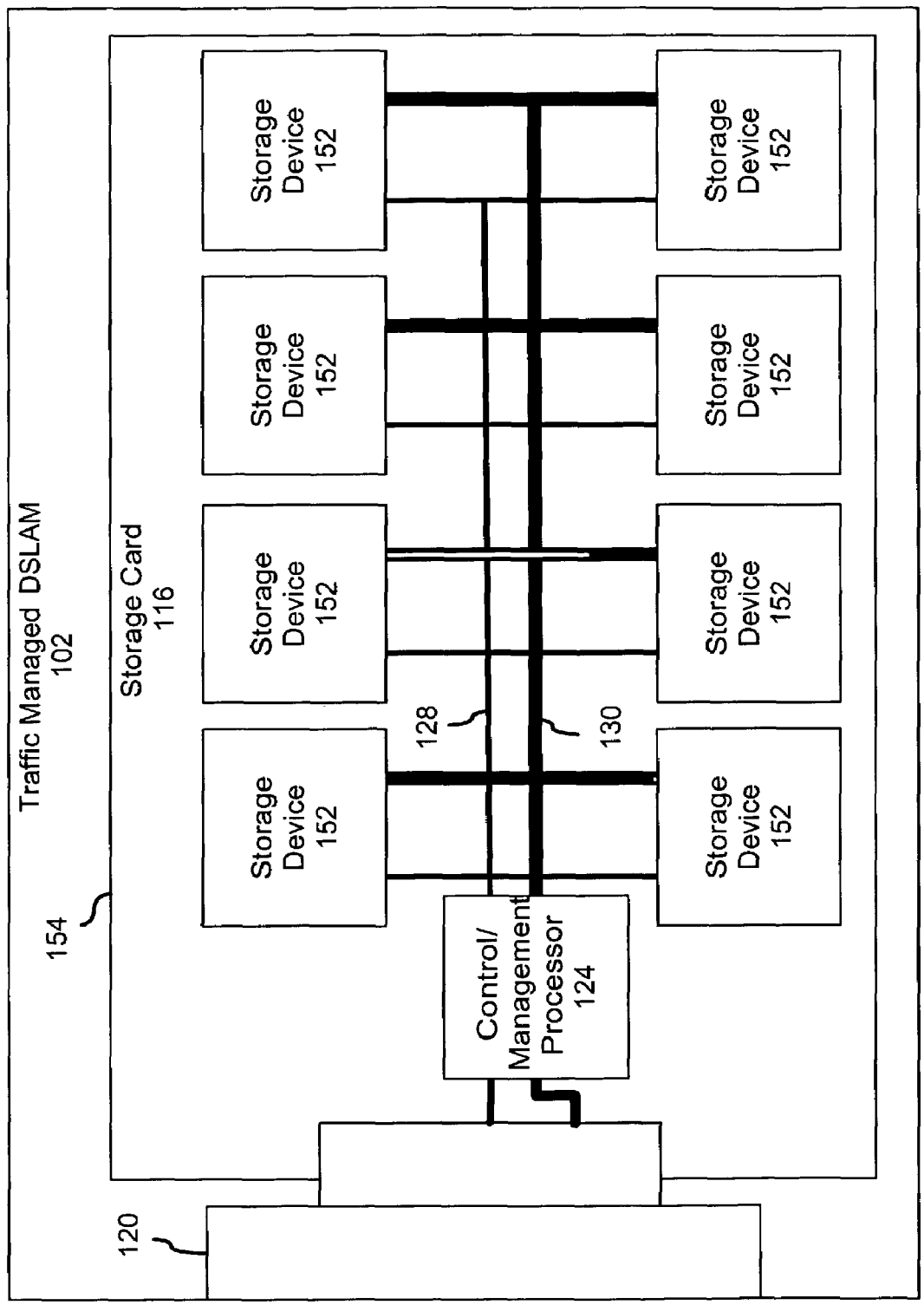
FIG. 11 depicts an embodiment of the storage card depicted in FIG. 2. space manager card depicted in FIG. 2.

FIG. 11 depicts an embodiment of the storage card 116. As depicted, the storage card 116 includes a control/management processor 124 (discussed above in reference to FIG. 3) and a series of discrete storage devices 152 mounted on a printed circuit board 154. The printed circuit board 154 is adapted for being mounted in one or more slots of the chassis of the traffic managed DSLAM 102. Attributes such as size, power consumption, etc will affect how many slots the card will be mounted in. Hard drive units designed for use in personal computers and/or laptop computers are one example of the discrete storage devices 152. RAM modules are another example of the discrete storage devices 152.

In addition to facilitating communication via the backplane 120 of the traffic managed DSLAM 102, the control/management processor also manages access to and from the discrete storage devices 50 via the control bus 128 and the data bus 130 (discussed above in reference to FIG. 3). The control bus 128 is provided between each one of the discrete storage devices 152 and the control/management processor 124. The data bus 130 is connected between each one of the discrete storage devices 152 and the control/management processor 124.

Figure 12:
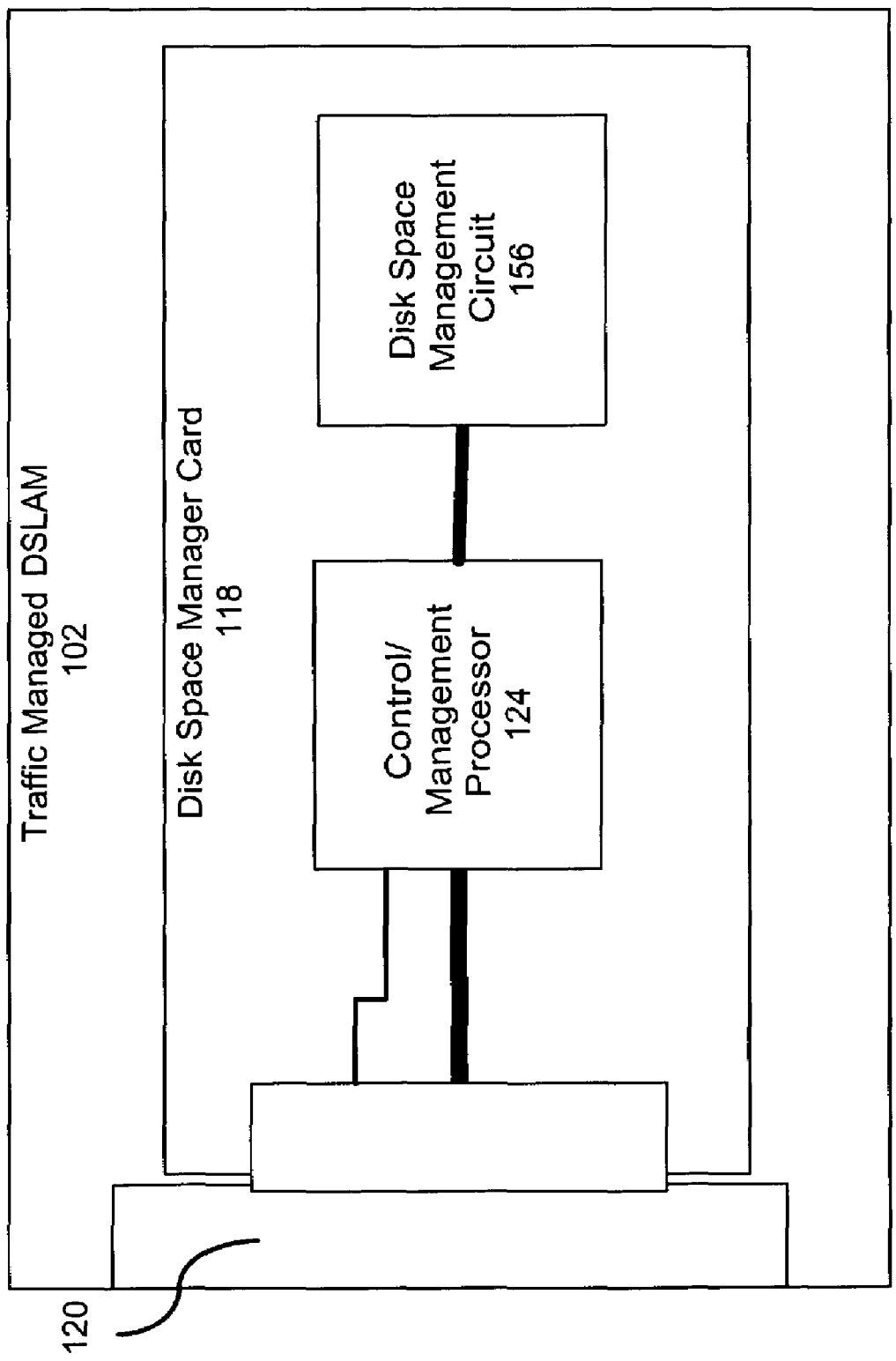
FIG. 12 depicts an embodiment of the disk space manager card depicted in FIG. 2.

FIG. 12 depicts an embodiment of the disk space management card 118. As depicted, the disk space management card 118 includes a control/management processor 124 (discussed above in reference to FIG. 3) and a disk space management circuit 156. The disk space management circuit 156 facilitates functionality for enabling authorized parties (e.g., authorized DSL subscribers, authorized content providers, etc) to manage their respective files stored on DSLAM-hosted storage (e.g., storage of the caching card 112, the storage card 116 and the storage unit 122). For example, a storage access application (not shown) running on a content provider data processing system communicates with the disk space manager 118 for accessing DSLAM-hosted storage that is assigned (e.g., leased by) to the content provider. Through communication between the disk space management card 118 and the storage access application running on a content provider data processing system, the content provider can store files, retrieve files and deletes files from assigned DSLAM-hosted storage.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for managing traffic flows through a Digital Subscriber Line Access Multiplexor (DSLAM), comprising:
   analyzing a traffic flow arriving at a DSLAM, wherein a type of the traffic flow is identified, which includes searching the traffic flow for a designated content component;
   associating a traffic flow identifier with the traffic flow, wherein the traffic flow identifier corresponds to the type of the traffic flow; and
   performing identifier-designated processing of the traffic flow which includes terminating the traffic flow in response to identifying the content component within the traffic flow.

2. A method for managing traffic flows through a Digital Subscriber Line Access Multiplexor (DSLAM), comprising:
   analyzing a traffic flow arriving at a DSLAM, wherein a type of the traffic flow is identified, which includes searching the traffic flow for a designated content component;
   associating a traffic flow identifier with the traffic flow, wherein the traffic flow identifier corresponds to the type of the traffic flow; and
   performing identifier-designated processing of the traffic flow which includes one of deleting the designated content component from the traffic flow and redirecting the traffic flow to another recipient in response to identifying the content component within the traffic flow.

3. A method for managing traffic flows through a Digital Subscriber Line Access Multiplexor (DSLAM), comprising:
analyzing a traffic flow arriving at a DSLAM, wherein a type of the traffic flow is identified, which includes assessing whether a file is in compliance with a file caching criteria;
associating a traffic flow identifier with the traffic flow, wherein the traffic flow identifier corresponds to the woe of the traffic flow; and
performing identifier-designated processing of the traffic flow which includes storing the file contained within the traffic flow in DSLAM-hosted storage in response to determining that the file is in compliance with the file caching criteria.

4. An apparatus adapted for facilitating Digital Subscriber Line Access Multiplexer (DSLAM) functionality, comprising:
a traffic access circuit adapted for enabling access to inbound traffic flows;
a traffic management circuit coupled to the traffic access circuit and including a data processor; and
a data processor program adapted for enabling the data processor to facilitate:
analyzing a particular one of said inbound traffic flows, wherein a type of the particular one of said inbound traffic flows is identified, which includes enabling the data processor to facilitate searching the particular one of said inbound traffic flows for a designated content component;
associating a traffic flow identifier with the particular one of said inbound traffic flows, wherein the traffic flow identifier corresponds to the type of the particular one of said inbound traffic flows; and
performing identifier-designated processing of the particular one of said inbound traffic flows which includes enabling the data processor to facilitate terminating the particular one of said inbound traffic flows in response to identifying the content component within the particular one of said inbound traffic flows.

5. An apparatus adapted for facilitating Digital Subscriber Line Access Multiplexer (DSLAM) functionality, comprising:
a traffic access circuit adapted for enabling access to inbound traffic flows;
a traffic management circuit coupled to the traffic access circuit and including a data processor; and
a data processor program adapted for enabling the data processor to facilitate:
analyzing a particular one of said inbound traffic flows, wherein a type of the particular one of said inbound traffic flows is identified, which includes enabling the data processor to facilitate searching the particular one of said inbound traffic flows for a designated content component;
associating a traffic flow identifier with the particular one of said inbound traffic flows, wherein the traffic flow identifier corresponds to the type of the particular one of said inbound traffic flows; and
performing identifier-designated processing of the particular one of said inbound traffic flows which includes enabling the data processor to facilitate one of deleting the designated content component from the particular one of said inbound traffic flows and redirecting the first traffic flow to another recipient in response to identifying the content component within the particular one of said inbound traffic flows.

6. An apparatus adapted for facilitating Digital Subscriber Line Access Multiplexer (DSLAM) functionality, comprising:
a traffic access circuit adapted for enabling access to inbound traffic flows;
a traffic management circuit coupled to the traffic access circuit and including a data processor;
a data processor program adapted for enabling the data processor to facilitate:
analyzing a particular one of said inbound traffic flows, wherein a type of the particular one of said inbound traffic flows is identified, which includes enabling the data processor to facilitate assessing whether the file is in compliance with a file caching criteria;
associating a traffic flow identifier with the particular one of said inbound traffic flows, wherein the traffic flow identifier corresponds to the type of the particular one of said inbound traffic flows; and
performing identifier-designated processing of the particular one of said inbound traffic flows; and
DSLAM-hosted storage coupled to the traffic management circuit, wherein enabling the data processor program to facilitate identifier-designated processing includes enabling the data processor to facilitate storing a file contained within the particular one of said inbound traffic flows in said DSLAM-hosted storage in response to determining that the file is in compliance with the file caching criteria.

* * * * *